(12) United States Patent
Puttagunta et al.

(10) Patent No.: US 11,187,429 B2
(45) Date of Patent: Nov. 30, 2021

(54) INTEGRATED HEAT AND ENERGY RECOVERY VENTILATOR SYSTEM

(71) Applicants: Srikanth Puttagunta, Westport, CT (US); Robb Aldrich, Bethel, CT (US); Barnett Cleary, Guilford, CT (US)

(72) Inventors: Srikanth Puttagunta, Westport, CT (US); Robb Aldrich, Bethel, CT (US); Barnett Cleary, Guilford, CT (US)

(73) Assignee: Steven Winter Associates, Inc., New York, NY (US)

( * ) Notice: Subject to any disclaimer, the term of this patent is extended or adjusted under 35 U.S.C. 154(b) by 171 days.

(21) Appl. No.: 16/046,524

(22) Filed: Jul. 26, 2018

(65) Prior Publication Data

US 2019/0063780 A1    Feb. 28, 2019

Related U.S. Application Data

(60) Provisional application No. 62/552,863, filed on Aug. 31, 2017.

(51) Int. Cl.
| | | |
|---|---|---|
| F24F 12/00 | (2006.01) | |
| F24F 11/00 | (2018.01) | |
| F24F 140/40 | (2018.01) | |
| F24F 140/30 | (2018.01) | |
| F24F 11/74 | (2018.01) | |

(52) U.S. Cl.
CPC ........ *F24F 12/006* (2013.01); *F24F 11/0001* (2013.01); *F24F 11/74* (2018.01); *F24F 2011/0002* (2013.01); *F24F 2012/007* (2013.01); *F24F 2140/30* (2018.01); *F24F 2140/40* (2018.01)

(58) Field of Classification Search
CPC .... F24F 11/001; F24F 201/0002; F24F 11/17; F24F 2140/30; F24F 2140/40; F24F 12/00; F24F 12/002; F24F 12/006; F24F 2012/007; Y02B 30/56
USPC ................................................. 165/252, 249
See application file for complete search history.

(56) References Cited

U.S. PATENT DOCUMENTS

| | | | |
|---|---|---|---|
| 5,632,675 A | 5/1997 | Kanninen et al. | |
| 5,855,320 A | 1/1999 | Grinbergs | |
| 6,328,095 B1 * | 12/2001 | Felber ................... | F24F 3/1423 165/222 |
| 6,688,966 B2 | 2/2004 | Akhtar | |

(Continued)

OTHER PUBLICATIONS

LifeBreath Indoor Air Systems, "ERV Installation Guide", Installation Manual, 69-ERV-Install 072717, pp. 1 to 24, https://www.lifebreath.com/wp-content/uploads/2017/11/69-ERV-Install-07-27-17-2.pdf, Jul. 27, 2017 (Jul. 27, 2017).

*Primary Examiner* — Len Tran
*Assistant Examiner* — Gustavo A Hincapie Serna
(74) *Attorney, Agent, or Firm* — St Onge Steward Johnston and Reens LLC (57) ABSTRACT

A heat recovery ventilator (HRV) and/or energy recovery ventilator (ERV) that integrates with a residential capacity air handling unit (AHU) is embodied in a small footprint HRV or ERV unit that connects directly to the return side of an AHU and to outdoor air inlet and exhaust ducts. The ventilator includes a control system incorporating a processor and sensors that control the operation of the system to provide desired ventilation flow rates under varying conditions.

20 Claims, 9 Drawing Sheets

(56) References Cited

U.S. PATENT DOCUMENTS

| | | | |
|---|---|---|---|
| 7,017,356 B2* | 3/2006 | Moffitt | F24F 3/1423 62/91 |
| 7,942,193 B2* | 5/2011 | Caldwell | F24F 12/006 165/66 |
| 8,459,569 B2* | 6/2013 | Gibbon | F23B 80/04 237/48 |
| 8,943,848 B2 | 2/2015 | Phannavong et al. | |
| 9,175,872 B2 | 11/2015 | McKie et al. | |
| 9,395,097 B2 | 7/2016 | McKie et al. | |
| 9,841,208 B2* | 12/2017 | Salerno | F24F 11/77 |
| 9,995,538 B2* | 6/2018 | Heberer | F28F 9/0075 |
| 10,041,743 B2* | 8/2018 | Heberer | F28D 21/0001 |
| 10,364,995 B2* | 7/2019 | Fischer | F24F 3/044 |
| 10,386,087 B2* | 8/2019 | McKie | F24F 12/006 |
| 2002/0017107 A1* | 2/2002 | Bailey | F24F 5/0046 62/238.7 |
| 2003/0013407 A1* | 1/2003 | Gagnon | F16L 41/08 454/237 |
| 2003/0042012 A1* | 3/2003 | Pearson | F24F 11/0001 165/210 |
| 2006/0270335 A1* | 11/2006 | Kim | F24F 3/147 454/237 |
| 2011/0155343 A1* | 6/2011 | Boudreau | F24F 13/30 165/10 |
| 2012/0052791 A1* | 3/2012 | Kurelowech | F24F 11/77 454/329 |
| 2012/0216558 A1* | 8/2012 | Dempsey | F24F 12/003 62/238.7 |
| 2013/0017774 A1* | 1/2013 | Zorzit | F24F 1/0035 454/239 |
| 2013/0180700 A1* | 7/2013 | Aycock | F24F 11/0001 165/248 |
| 2014/0190670 A1* | 7/2014 | Dempsey | F24F 12/006 165/121 |
| 2016/0018123 A1* | 1/2016 | Yabunouchi | F24F 11/30 700/278 |
| 2016/0106008 A1* | 4/2016 | Cotton | F24F 5/0035 165/248 |
| 2016/0131377 A1* | 5/2016 | Lee | F24F 3/044 165/252 |
| 2016/0370029 A1* | 12/2016 | Kurelowech | F24F 12/006 |
| 2019/0332072 A1* | 10/2019 | Beaty | G05D 23/1917 |

* cited by examiner

INTEGRATED HEAT AND ENERGY RECOVERY VENTILATOR SYSTEM

This invention was made with Government support under cooperative agreement award No. DE-EE0007572 by the Department of Energy. The Government has certain rights in this invention.

FIELD OF THE INVENTION

The invention relates to the field of residential HVAC systems, more particularly, to the field of air to air heat/energy exchangers, otherwise known as Heat Recovery Ventilation or Energy Recovery Ventilation (HRV or ERV) Systems.

BACKGROUND OF THE INVENTION

As energy efficiency standards and construction techniques have improved, new and retrofitted buildings have become more air-tight; the reduced outside air infiltration in such buildings can result in poor indoor air quality. Accordingly, mechanical ventilation devices have become a frequent element of HVAC systems in homes. Mechanical ventilation devices provide an intake of fresh outside air to a conditioned interior space, and/or exhaust indoor air to the outside. Mechanical ventilation is typically provided by one of three methods: exhaust-only (indoor air is exhausted resulting in a negative building pressure to draw in outdoor air through infiltration), supply-only (outdoor air is supplied to the interior space resulting in a positive building pressure that forces indoor air out through exfiltration), and balanced (outdoor air is supplied to the interior space and indoor air is exhausted to the outdoors resulting in a neutral impact to building pressures).

The most common balanced air exchange devices in dwellings are heat recovery ventilators (HRVs) and energy recovery ventilators (ERVs). These devices provide fresh ventilation air to occupants and exhaust stale air to dilute contaminant levels in the indoor air. HRVs transfer sensible heat (temperature) between outflow and inflow air streams by passing exhaust and incoming fresh air across a heat exchanger, saving energy by pre-cooling or pre-heating the incoming fresh air. ERVs transfer moisture in addition to sensible heat between the two air paths.

Installation of an air exchange device requires additional space and costs beyond a conventional heating and/or cooling system.

HRV and ERV products that are attached to heating and/or cooling distribution systems, rather than using a dedicated distribution system, often have short-circuiting problems (where fresh outdoor air can be exhausted before it is distributed to occupied space) and unbalanced air flow problems. In addition, these units are often incorrectly ducted, have improper clearances for maintenance, and have high electric power consumption.

In current standard practice, controls for ventilation are typically poorly integrated (if at all) with controls for heating/cooling. Desired ventilation flow rates are often not achieved due to system pressure fluctuations and negative pressures caused by operation of the heating/cooling air handler unit and poor ducting design. Both outdoor air and exhaust air flow rates can vary significantly, resulting in the system being unbalanced.

Figure 1:
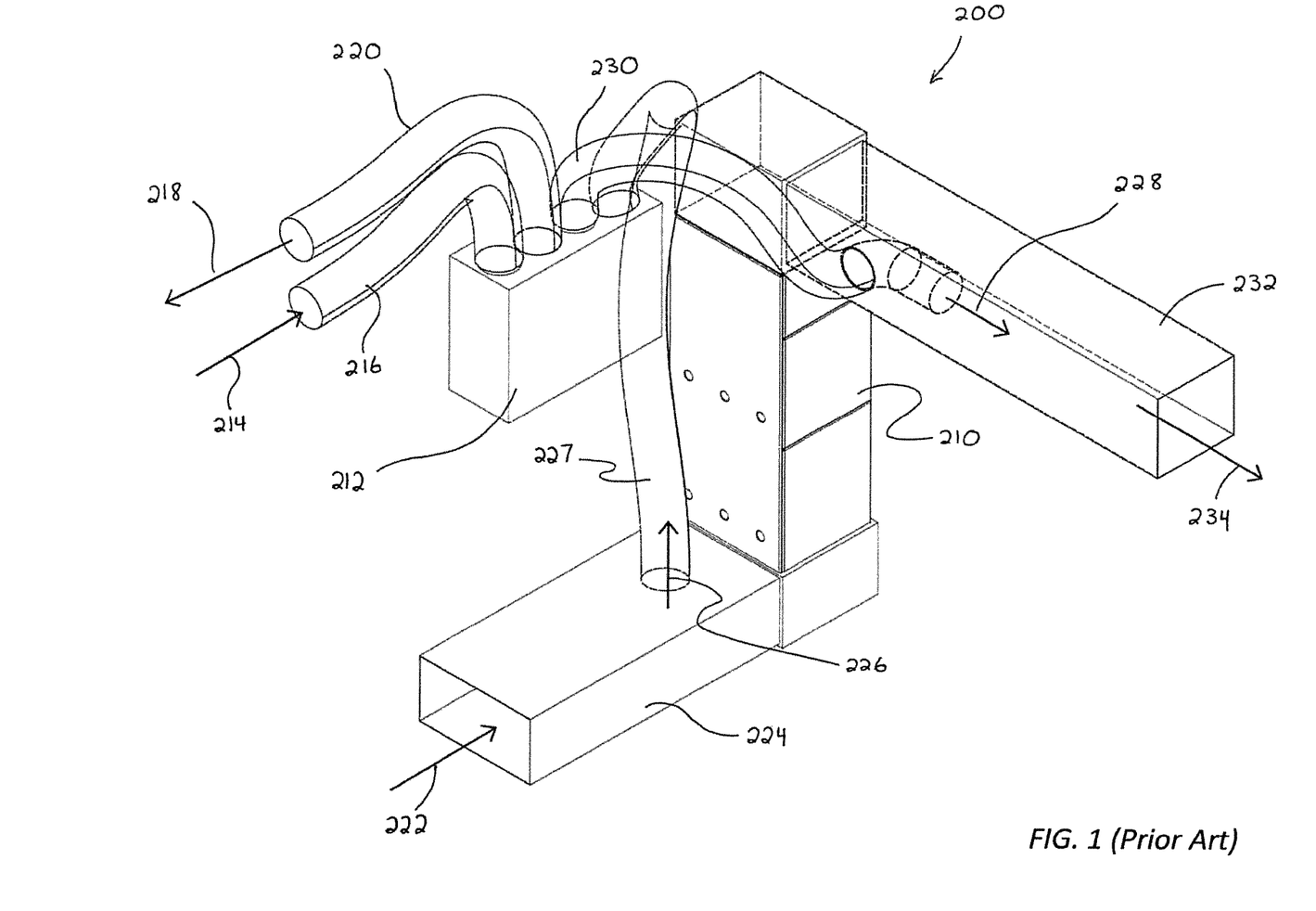
FIG. 1 is a perspective view of a prior art HRV/ERV unit integrated into a central air handler unit.

A prior art residential HVAC system 200 is shown in FIG. 1. HVAC system 200 is provided with an air handling unit (AHU) 210 and a HRV/ERV unit 212. Outdoor intake air 214 enters the HRV/ERV unit 212 via duct 216. Exhaust air 218 exits the HRV/ERV unit 212 via duct 220. Return air 222 from the conditioned space enters return trunk 224 and a portion, which is extract air 226, is withdrawn through extract air duct 227 to the HRV/ERV unit 212, where heat (and moisture, if an ERV) is exchanged to temper outdoor intake air 214, and the extract air 226 is exhausted as exhaust air 218. The tempered intake air 228 is provided via duct 230 to the main supply air duct 232 which contains airflow from AHU 210 and directs heated or cooled supply air 234 to the conditioned space.

In prior art systems such as shown in FIG. 1, it is typical that the flow rates of the extract air 226 and the exhaust air 218 are less, often significantly less than the rated amount intended by the HRV/ERV manufacturer. This occurs because the HRV/ERV fan is competing against the negative pressure created by the primary AHU fan.

In prior art systems such as shown in FIG. 1, it is typical that the flow rates of the outdoor intake air 214 and the tempered intake air 228 are less, often significantly less than the rated amount intended by the HRV/ERV manufacturer. This occurs because the HRV/ERV fan is competing against large static pressures and duct restrictions associated with improper or suboptimal installation.

A further problem can occur if the supply air 234 pressure causes a reverse flow of the tempered intake air 228. This reverse flow creates a pressure increase in duct 230, which diminishes outdoor air intake flows.

Some manufacturers now recommend the inclusion of supply side elbows for the outdoor air intake ventilation connection within the supply duct 232, the purpose of which is to prevent reverse flow through duct 230. While this may alleviate some concerns with supply side pressures, it is not straightforward to implement and is not commonly installed.

Unbalanced air flow can be worsened if the AHU is a variable-speed air handler. Air flow balancing of typical HRV/ERV equipment is implemented for a particular air flow, e.g. at one specific fan speed setting; so when the AHU operates at other fan speeds, the various air flow rates through the HRV/ERV are likely to be unbalanced.

It is a significant problem that current state of the art HRV/ERV systems applied to ducted heating/cooling systems provide very inconsistent ventilation flow rates. The ventilation system cannot adapt to intermittent operation and variability of the heating and cooling system.

SUMMARY OF THE INVENTION

A heat recovery ventilator (HRV) and/or energy recovery ventilator (ERV) is integrated to the return side of a residential capacity air handling unit (AHU) which delivers space conditioning (heating and/or cooling) to a building, dwelling, or space. Outdoor air is moved through an air-to-air heat exchanger (AAE) using a variable-speed outdoor air fan, or negative pressure created by the AHU fan or other fans or methods, or a combination of an outdoor air fan and negative pressure. Outdoor air flow rates are adjusted with modulating dampers and/or by varying the speed of the outdoor air fan. Outdoor air is tempered through an air-to-air exchanger (AAE), including plate heat exchangers, membrane energy exchangers, enthalpy wheels, or heat pipe systems. The tempered outdoor air is mixed with return air before entering an AHU where it may be heated or cooled prior to being delivered to the space. A variable-speed exhaust fan moves indoor air through the other pathway in the AAE and exhausts the air to outdoors. A control system incorporating a processor and process variable sensors that control the operation of the system to provide desired ventilation flow rates under varying conditions. Adjustments to fans and/or dampers by the control system maintain the desired outdoor air and exhaust flow rates. Filters on all air streams protect the components and minimize potential contaminants in the ventilation air. The invention provides continuously verified, balanced, distributed, heat/energy recovery ventilation that is easily integrated to a residential AHU.

The present invention provides specific design features that provide (1) a small footprint HRV or ERV unit that integrates directly to the return side of a residential capacity air handling unit (AHU), (2) reduced air duct installation and connections needed to install the unit, and (3) continuous control and verification of desired ventilation rates.

The control system includes sensors capable of measuring environmental variables comprising, but not limited to, temperature and air flow, and a processor capable of receiving said sensor signals and further capable of controlling the operation of aforementioned ventilator based at least in part on said sensor signals. The control system algorithm controls the operation of the ventilation system based on user input and said sensor readings.

An embodiment of the invention is a heat and/or energy recovery ventilator that includes a case adapted to be mounted directly to a return side of an air handling unit of a residential HVAC system and receive return air and containing: an air-to-air exchanger; a mixing plenum for receiving return air from the conditioned space; a mixing plenum air inlet for receiving return air from the conditioned space; a mixing plenum air outlet for releasing air from the mixing plenum; an extract air inlet for receiving extract air from the return air from the conditioned space; an extract air flow path connecting the extract air inlet to the air to air exchanger; an outdoor air inlet for receiving outdoor air; an outdoor air flow path connecting the outdoor air inlet to the air to air exchanger whereby outdoor air received in the air to air exchanger is tempered by the extract air to provide tempered outdoor air; a tempered outdoor air flow path connecting the air to air exchanger to the mixing plenum whereby tempered outdoor air is mixed with return air from the conditioned space in the mixing plenum; an exhaust air outlet; and an exhaust air flow path connecting the air to air exchanger to the exhaust air outlet. Preferably, a frost prevention control adjustable damper connecting the mixing plenum and outdoor air inlet is provided. Extract air is passed through the air to air exchanger and becomes exhaust air; and exhaust air flows through the exhaust air flow path to the exhaust air outlet. The mixing plenum air outlet provides an air flow path to the air handling unit. The heat and/or energy recovery ventilator is sized and adapted to be positioned below the air handling unit of a residential HVAC system with the heat and/or energy recovery ventilator and air handling unit forming a vertical stack.

One or more of (1) a variable speed outdoor air fan provided in the outdoor air flow path for controlling quantity of outdoor air received to the air-to-air exchanger; (2) a variable speed exhaust fan provided in the exhaust air flow path for controlling quantity of extract air received to the air-to-air exchanger; and (3) a modulating outdoor air intake damper provided in the outdoor air flow path for controlling quantity of outdoor air received to the air-to-air exchanger; are provided with the heat and/or energy recovery ventilator.

A control system for the heat and/or energy recovery ventilator system includes one or more of (1) means for controlling the position of the modulating outdoor air intake damper, which preferably is a module which activates the modulating outdoor air intake damper to close the damper when negative pressure in the mixing plenum draws in more outdoor air through the air-to-air exchanger than desired or when closure of the outdoor air stream is desired; (2) means for determining a volumetric flow rate of air through the outdoor air inlet and means responsive to a determination of the volumetric flow rate of air through the outdoor air inlet to control a speed of the variable speed outdoor fan; and (3) means for determining a volumetric flow rate of air through the exhaust air outlet and means responsive to the determination of the volumetric flow rate of air through the exhaust air outlet to control a speed of the variable speed exhaust fan. The control system also controls the frost prevention control adjustable damper and includes means for measuring dry bulb temperature of air flowing through the outdoor air flow path adjacent and just prior to entering the air-to-air exchanger; and means for controlling the frost prevention control adjustable damper such that return air from the conditioned space enters the outdoor air flow path; whereby a temperature of outdoor air in the outdoor air flow path is increased by an amount sufficient to avoid frost formation on the air-to-air exchanger.

The control system maintains desired ventilation flow rates under varying conditions and heating/cooling operation of an air handler unit and preferably includes means for receiving user directed outdoor air volumetric flow targets; means for comparing determined volumetric flow rates to user directed volumetric flow targets; and means of controlling one or more fans and/or dampers whereby the difference between determined values and targets is reduced to less than 5 cfm over the course of 1 minute.

BRIEF DESCRIPTION OF THE DRAWINGS

FIG. 5c is an elevated −45° top, front, and left side perspective view of the HRV/ERV unit of FIG. 5a.

DETAILED DESCRIPTION OF THE INVENTION

"Air handling unit" or "AHU" refers to a device containing a blower and heating and/or cooling elements used to regulate and distribute conditioned air as part of a heating, ventilating, and air-conditioning (HVAC) system.

"Air-to-air exchanger" or "AAE" refers to any exchanger that transfers sensible heat (temperature) or enthalpy (temperature and moisture) between inflow and outflow air streams. Examples of an AAE include a plate heat exchanger, membrane energy exchanger, enthalpy wheel, or heat pipe system.

"Heat recovery ventilator" or "HRV" refers to a unit containing an AAE that transfers sensible heat (temperature) between inflow and outflow air streams and which is optionally provided with an associated fan(s) or blower(s), damper(s) and a control system.

"Energy recovery ventilator" or "ERV" refers to a unit containing an AAE that transfers enthalpy (temperature and moisture) between inflow and outflow air streams and which is optionally provided with an associated fan(s) or blower(s), damper(s) and a control system.

"HRV/ERV unit" refers to a unit which can be either a HRV or an ERV. The selection of a specific ERV or HRV may be determined based on engineering considerations regarding relative cost, maintenance, relative efficiency in the context of local climate conditions, and other considerations.

Figure 2:
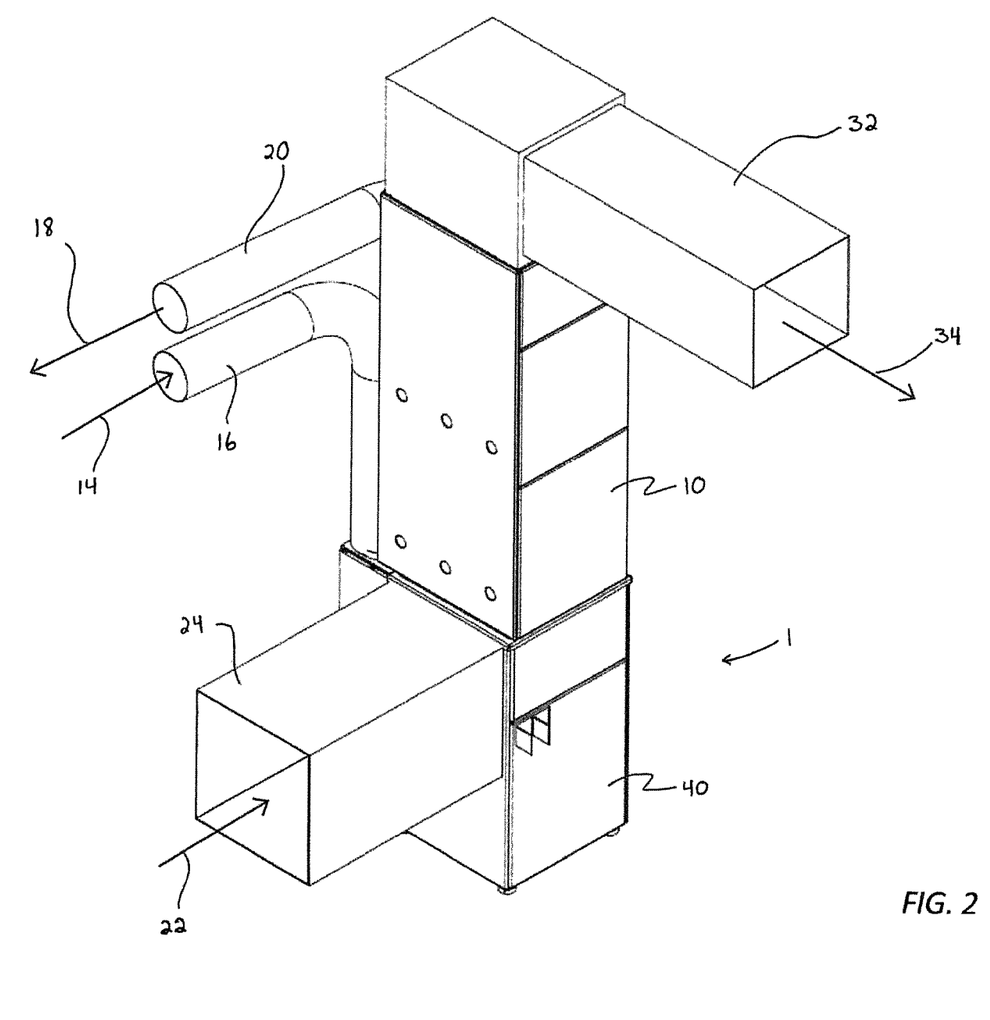
FIG. 2 is a perspective view of an HRV/ERV unit in accordance with an embodiment of the invention integrated into a central air handler unit.

The present invention provides an HRV/ERV unit which attaches to the return side of an AHU and is able to maintain consistent ventilation air flow rates under varying heating and cooling operating conditions. FIG. 2 depicts an HVAC system 1 which includes an AHU 10. In FIG. 2, HRV/ERV unit 40 is integrated into the return side of AHU 10 with the HRV/ERV 40 located below the AHU 10 so that together they form a vertical stack. In other embodiments, the HRV/ERV 40 located horizontally adjacent to AHU 10 so that together they form a horizontal row. Outdoor intake air 14 enters the HRV/ERV unit 40 via duct 16. Exhaust air 18 exits the HRV/ERV unit 40 via duct 20. Return air 22 from the conditioned space enters return trunk 24; extract air (not shown) which may be a portion of the return air 22 or a separate air flow, is directed to the HRV/ERV unit 40, where heat (and moisture, if an ERV) is exchanged to temper the outdoor intake air 14, and the extract air is exhausted as exhaust air 18. The tempered intake air is mixed with return air 22 and provided directly to the AHU 10 and distributed as supply air 34 via the main supply air duct 32 to the conditioned space.

As seen in FIG. 2, HRV/ERV unit 40 compactly integrates to the AHU 10. The HRV/ERV unit 40 requires less space, less attached ductwork, and does not require the installation of a supply duct elbow extension into the supply trunk, thus reducing cost and installation time/materials. The invention allows filtered, tempered, and conditioned fresh air to be distributed to building spaces through the same supply air distribution system used for heating and cooling. The inclusion of variable speed fans and proper controls eliminate inconsistent and unbalanced flow problems in prior art.

Figure 3:
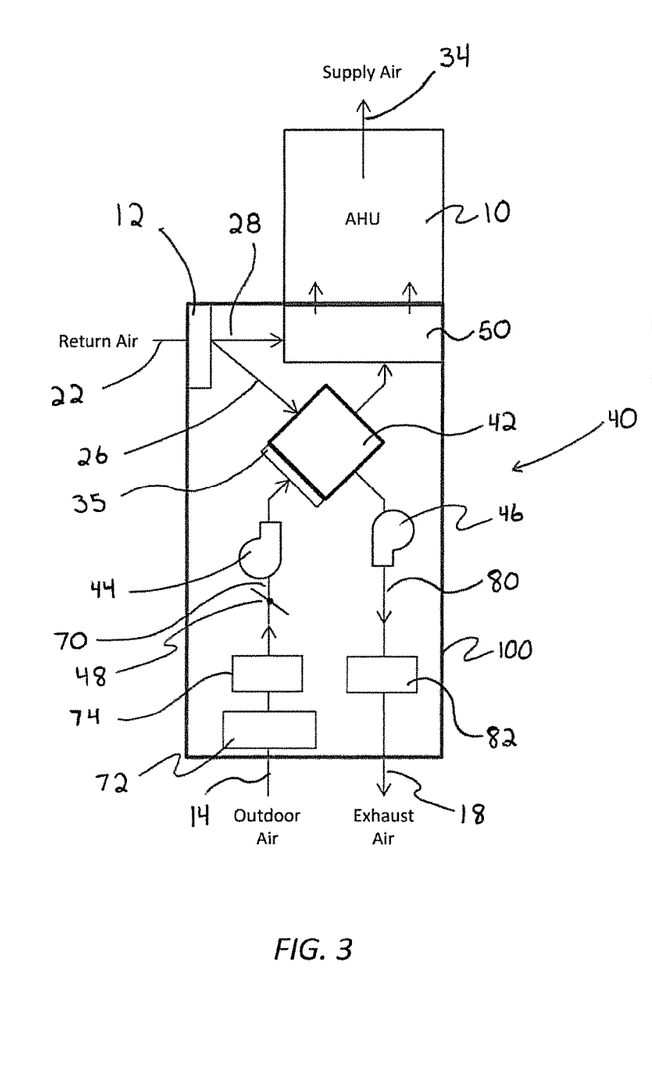
FIG. 3 is a two-dimensional schematic of an HRV/ERV unit in accordance with an embodiment of the invention where extract air is removed from the return air.

FIG. 3 is a two-dimensional schematic of an embodiment of HRV/ERV unit 40. HRV/ERV unit 40 includes a case 100 containing an AAE 42. HRV/ERV unit 40 is optionally provided with a variable-speed outdoor air fan 44, and/or a variable-speed exhaust fan 46 and/or an adjustable outdoor air damper 48. Air intake duct 70 is preferably provided with an intake prefilter 72 and optionally provided with an air flow sensor 74. An air filter 35 is provided at AAE 42 to filter the outdoor air before it enters AAE 42. Exhaust air duct 80 is optionally provided with an airflow sensor 82.

In FIG. 3, return air 22 from the conditioned space is filtered through filter 12 and then divided into an extract air stream 26 which is directed to AAE 42 and a return air stream 28 which is directed to mixing plenum 50 of the HRV/ERV unit 40, which connects to AHU 10.

Figure 4:
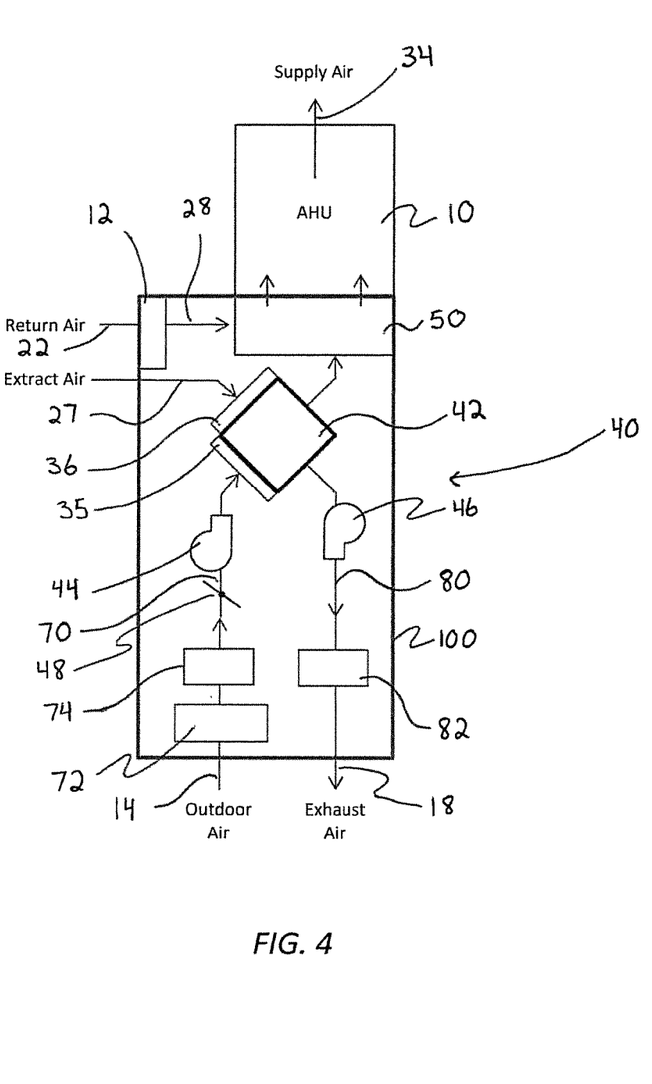
FIG. 4 is a two-dimensional schematic of an alternative embodiment of a HRV/ERV unit invention where extract air is separate from the return air.

FIG. 4 is another two-dimensional schematic of an embodiment of HRV/ERV unit 40. HRV/ERV unit 40 includes the same components as described above with respect to FIG. 3, but differs in that an extract air stream 27 is withdrawn from the conditioned space in separate ducting through filter 36, and directed to AAE 42. The configuration of FIG. 4 will be used in systems where it is desired to have an HVAC system that actively exhausts air from certain areas of a house, for example, bathroom or kitchen areas which are often the source of odors and excessive moisture.

Figure 5A:
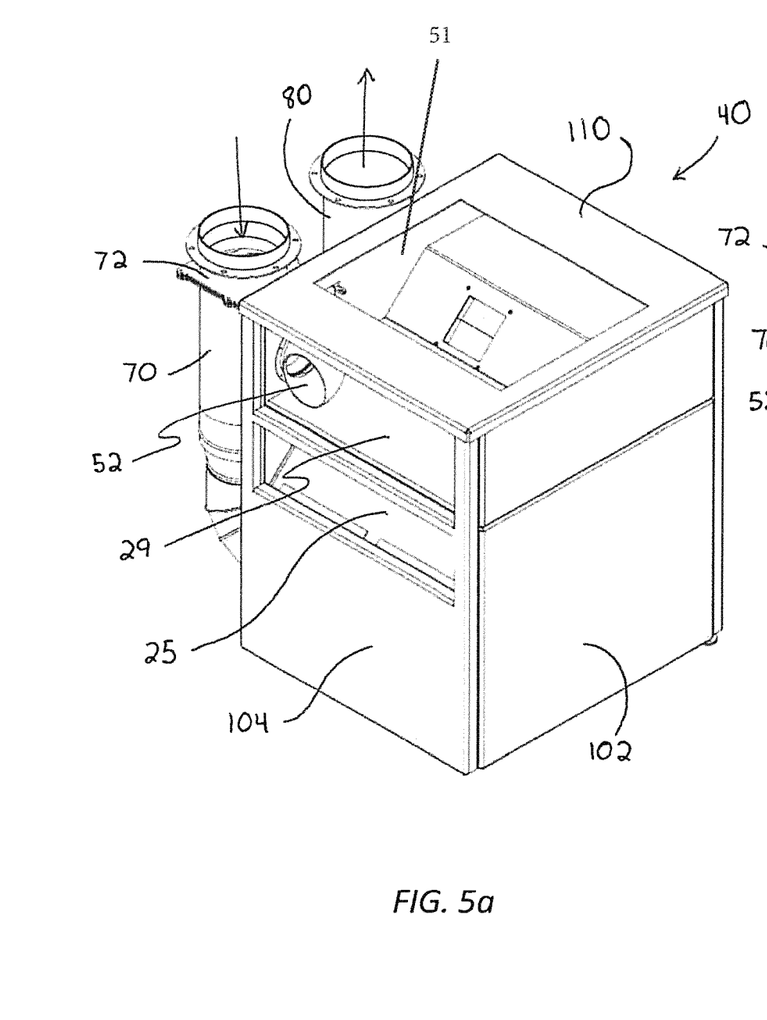
FIG. 5a is an elevated 45° top, front, and right side perspective view of an HRV/ERV unit in accordance with an embodiment of the invention.
Figure 5B:
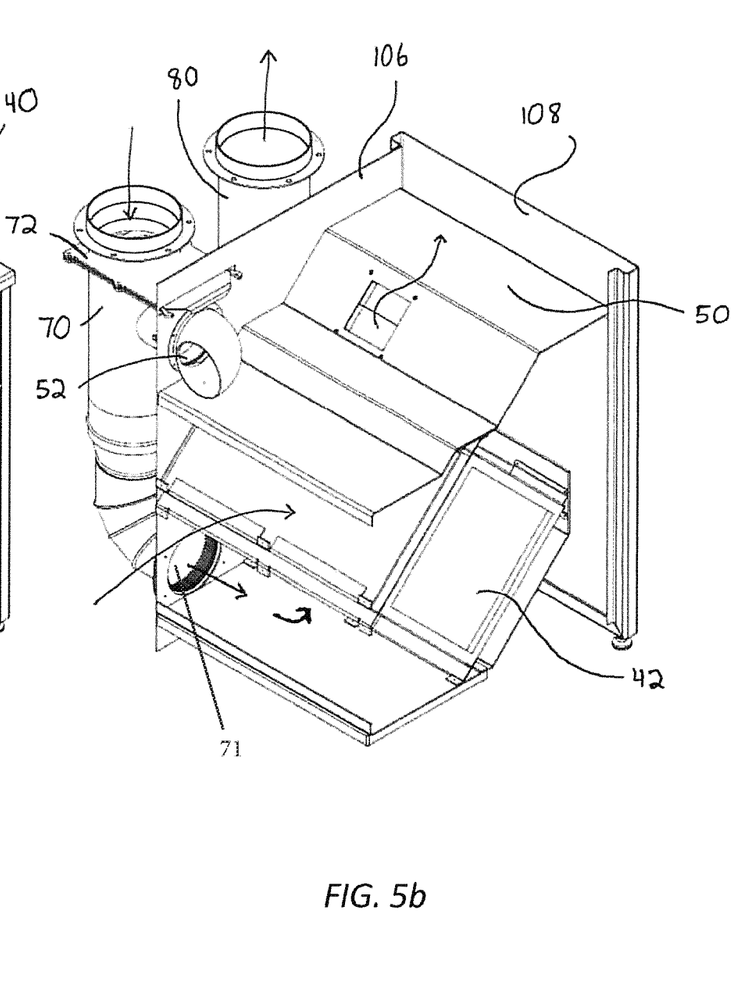
FIG. 5b is an elevated 45° top, front, and right side perspective view of the HRV/ERV unit of FIG. 5a with its top, front, right side, and bottom exterior panels removed to illustrate the interior components.
Figure 5C:
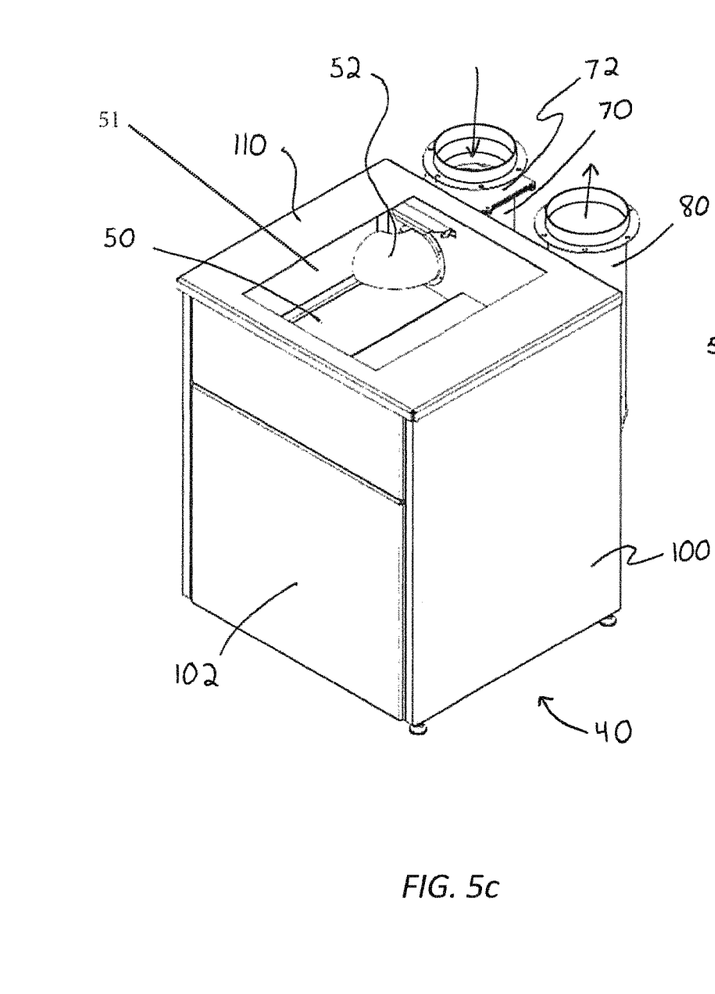
Figure 5D:
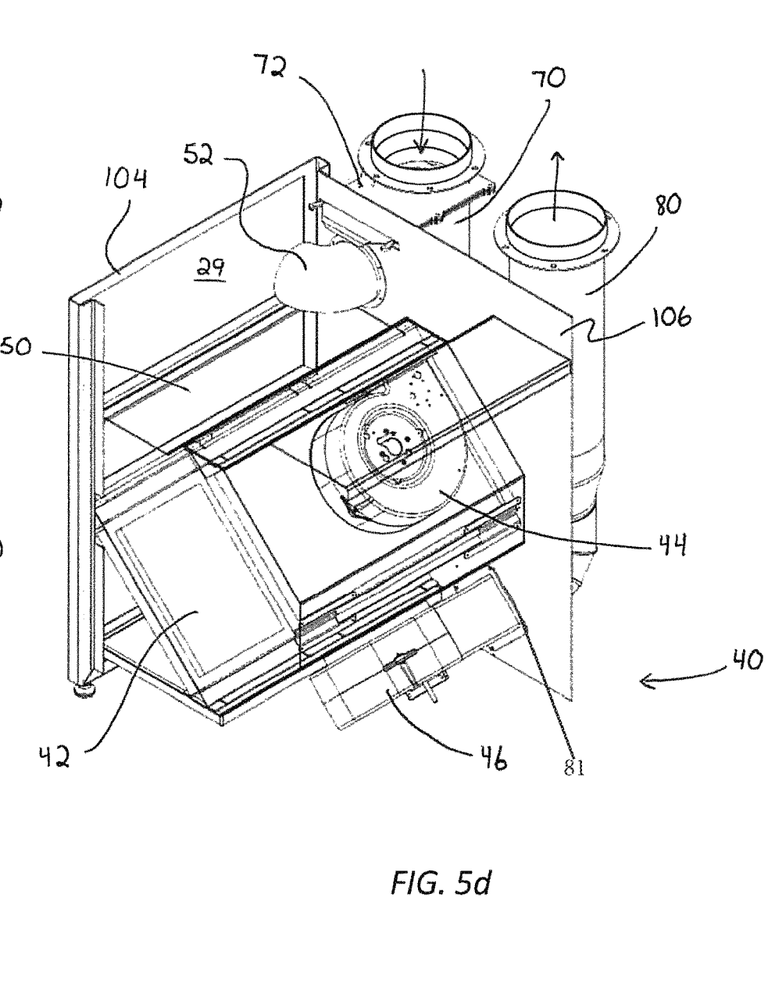
FIG. 5d is an elevated −45° top, front, and left side perspective view of the HRV/ERV unit of FIG. 5c with its top, front, left side and bottom exterior panels removed to illustrate the interior components.

FIG. 5a and FIG. 5c illustrate an embodiment of a HRV/ERV unit 40 in accordance with the invention. FIG. 5b and FIG. 5d illustrate the HRV/ERV unit 40 of FIGS. 5a and 5c with its exterior panels removed in order to illustrate interior components. HRV/ERV unit 40 comprises a case 100 preferably constructed of a framework onto which front face panel 102, left side panel 104, rear face panel 106, right side panel 108, top cover panel 110 and bottom cover panel 112 are attached. HRV/ERV unit 40 has a first case opening 29 in left side panel 104, the first case opening 29 connecting to mixing plenum 50 in a portion of the case 100 and providing a mixing plenum air inlet for receiving return air from a conditioned space. HRV/ERV unit 40 has a second case opening 25 also in left side panel 104, the second case opening 25 connecting to an extract air flow path and providing an extract air inlet for receiving extract air from the return air from the conditioned space. HRV/ERV unit 40 has a third case opening 51 in top cover panel 110, the third case opening 51 connecting to the mixing plenum 50 and providing a mixing plenum air outlet for releasing air from the mixing plenum 50 directly to the AHU 10. HRV/ERV unit 40 has a fourth case opening 71 in rear face panel 106, the fourth case opening 71 connecting to an outdoor air flow path and providing an outdoor air inlet for receiving outdoor air. HRV/ERV unit 40 has a fifth case opening 81 in rear face panel 106, the fifth case opening 81 connecting to an exhaust air flow path and providing an exhaust air outlet for releasing exhaust air. In one embodiment, exhaust fan 46 is mounted on the inside wall of rear face panel 106 with its exhaust opening fitted to fifth case opening 81. HRV/ERV unit 40 uses the negative pressure (suction) created by AHU 10 to draw fresh outdoor air 14 through air intake duct 70 to the AAE 42, and direct the return air stream 28 (the balance of the return air 22) though opening 29 to mixing plenum 50. Tempered outdoor air exits the AAE 42 and is directed into the mixing plenum 50 where it mixes with return air stream 28 before being directed into an AHU. In this embodiment, a variable-speed outdoor air fan 44 will operate to meet the outdoor air flow set point if the negative pressure from an AHU is insufficient. In this embodiment, HRV/ERV unit 40 uses exhaust fan 46 to draw return air 22 through extract air stream 26. The invention allows for transfer of heat and/or moisture between the incoming outdoor intake air 14 and the extract air stream 26 as both streams pass through AAE 42. This results in distribution of tempered outdoor air through the heating and cooling distribution system (obviating the need for separate ventilation supply ducts).

Figure 6:
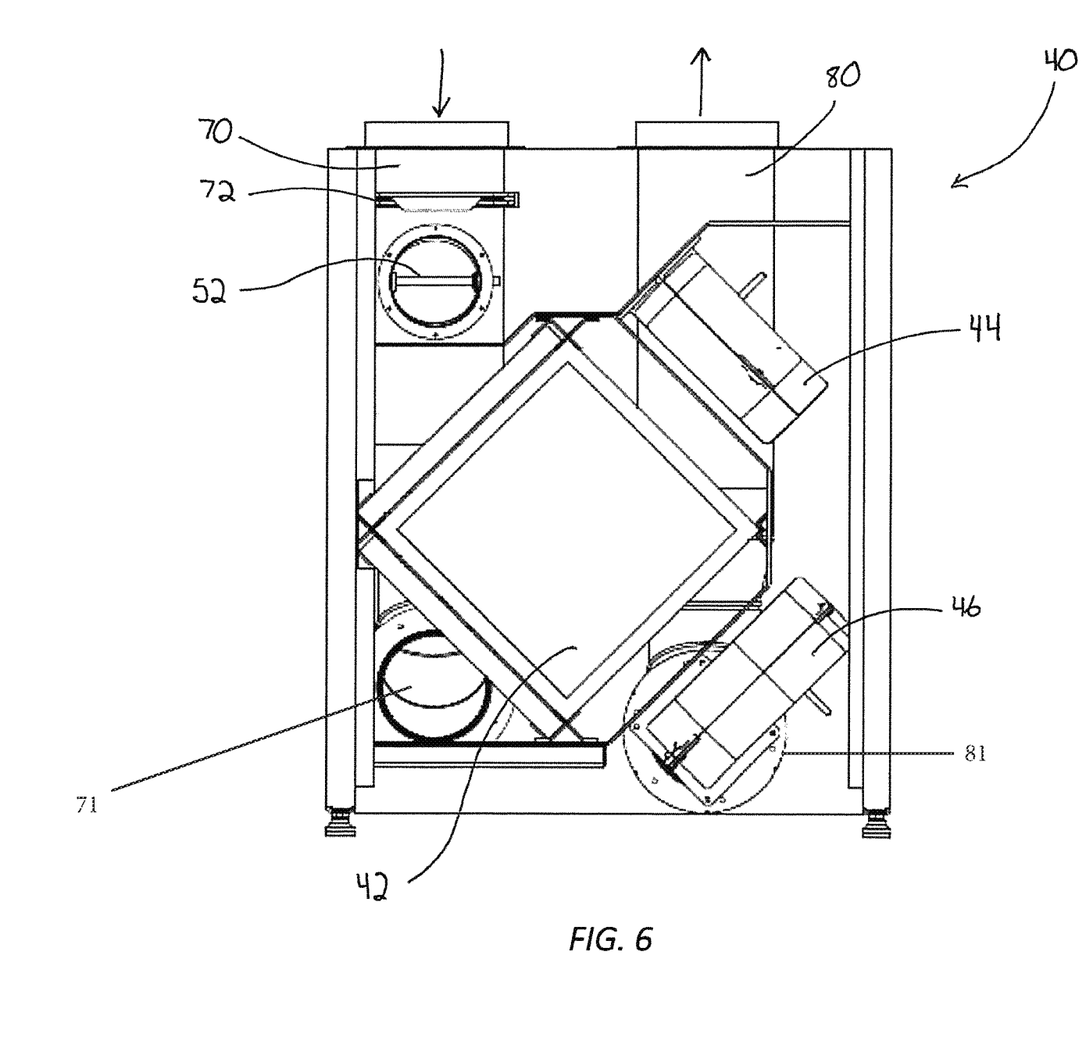
FIG. 6 is a front elevation view of the HRV/ERV unit of FIG. 5a with its front exterior panel removed to illustrate the interior components.

FIG. 6 illustrates a front view of an embodiment of HRV/ERV unit 40 with the exterior removed to illustrate interior components. In FIG. 6, variable-speed outdoor air fan 44 allows for control of outdoor intake air 14 flow rates through outdoor air duct 70. The variable-speed exhaust fan 46 allows for control of exhaust air 18 flow rates through the exhaust air duct 80.

The HRV/ERV unit 40 of FIGS. 5a-5d and 6 is provided with a means for frost prevention control. The frost prevention control is provided by an adjustable damper 52 which connects return air stream 28 to outdoor air intake duct 70. When air temperature of the outdoor air pathway just prior to entering AAE 42 is below temperatures which could cause frost to form on AAE 42, adjustable damper 52 opens to mix a portion of return air stream 28 with outdoor intake air 14 to pre-temper the outdoor air to minimize frost potential. The temperature of the air entering the AAE is determined by a dry bulb temperature sensor. Other embodiments of HRV/ERV unit 40 may implement alternative frost control systems such as pre-heating of outdoor air 14, or partial bypass of outdoor air 14 around AAE 42. Alternatively, if necessary, return air 22 from the conditioned space may be circulated or recirculated through AAE 42 to defrost it.

The fans, dampers, and other devices are controlled by a system which uses process variable sensors in combination with control logic to maintain user specified operating parameters. Such process parameters may include temperature, humidity, pressure, air flow, and/or others. Control of both outdoor air and exhaust air flow rates are maintained under a wide range of operating conditions (e.g. different duct configurations, varying AHU fan speeds, wind and building pressurization, etc.). A volumetric flow rate of air through the outdoor air inlet is determined by direct measurement of pressure or air flow speed at or adjacent to the outdoor air inlet; or by indirect determination using manufacturer's specifications for air flow volume based on power setting or fan speed (RPM) (which can be determined or measured) of the outdoor air fan; and/or by a calculation of air flow volume based on fan speed. Similarly, a volumetric flow rate of air through the exhaust air outlet is determined by direct measurement of pressure or air flow speed at or adjacent to the exhaust air outlet; or by indirect determination using manufacturer's specifications for air flow volume based on power setting or fan speed (RPM) (which can be determined or measured) of the exhaust fan; and/or by a calculation of air flow volume based on fan speed.

The control algorithm interprets the flow rates of outdoor intake air 14 and extract air 26/27 and/or exhaust air 18, and uses this determination to adjust control signals sent to either intake fan 46, exhaust fan 44, outdoor air damper 48, frost prevention damper 52, or any combination thereof. The control algorithm samples process parameters in discrete time intervals, using this sampled data to maintain flow rates within 5 CFM of target.

Figure 7:
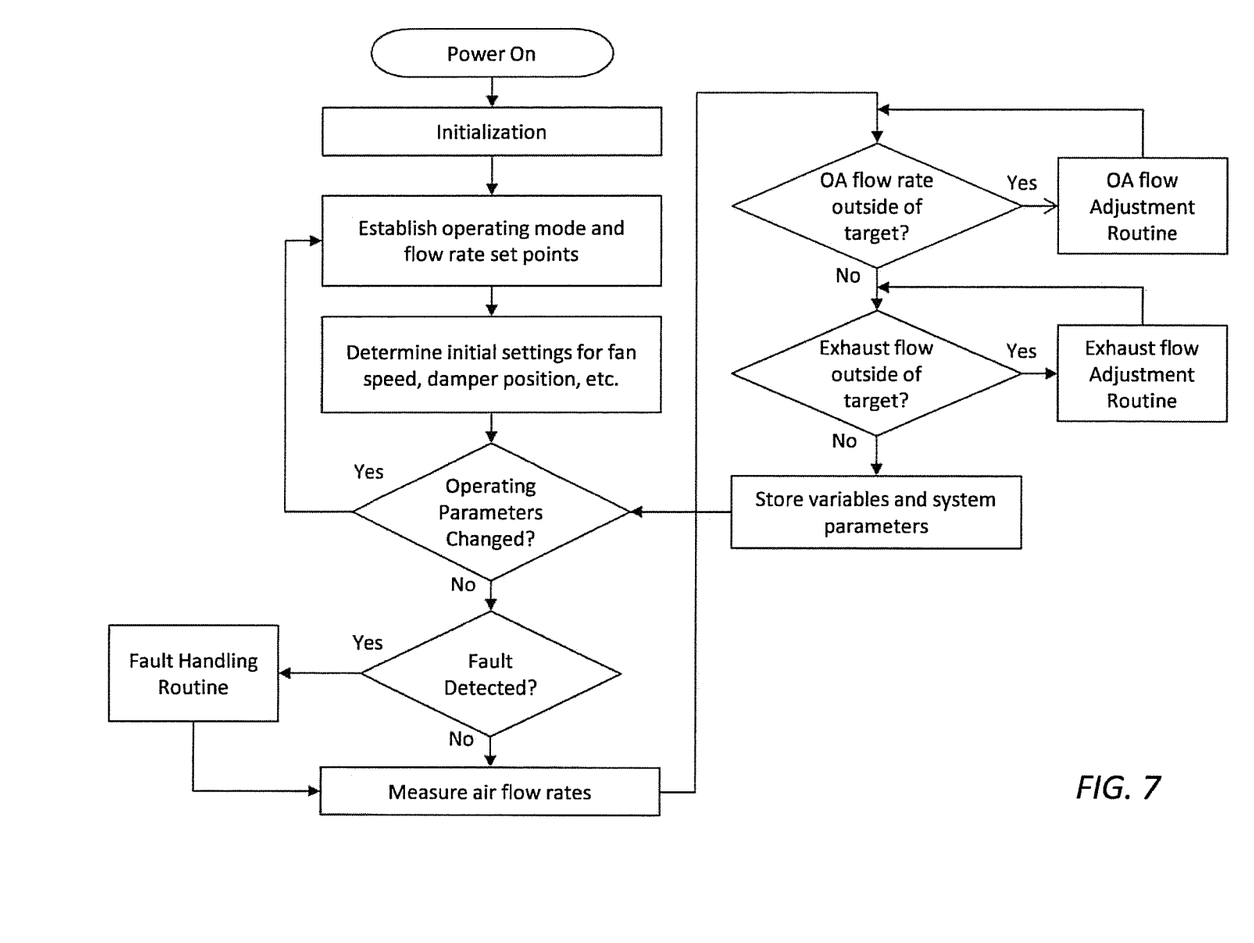
FIG. 7 is a control logic flow diagram of the general loop structure for operation of a heat recovery ventilator (HRV) unit in accordance with an embodiment of the invention.
Figure 8:
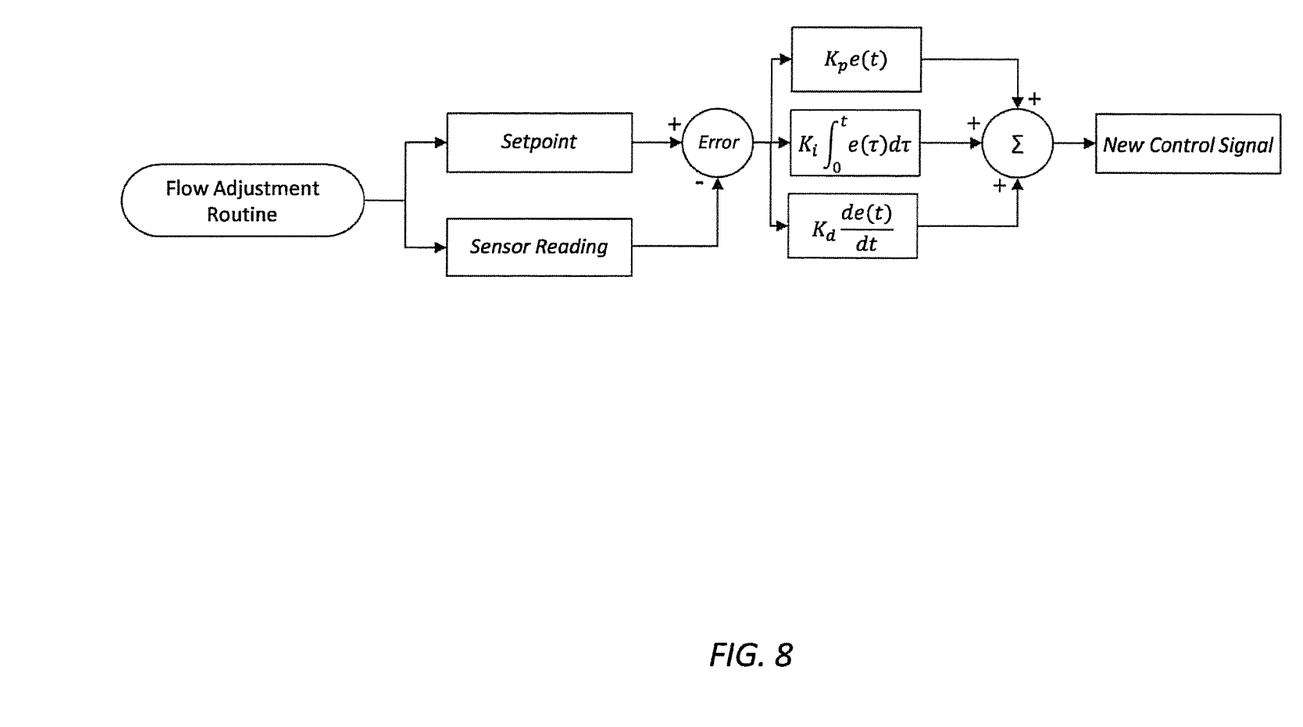
FIG. 8 is an embodiment of the control logic flow diagram of a Flow Adjustment Routine as seen in FIG. 7, showing the general procedure for controlling air flow rate.

FIG. 7 and FIG. 8 outline basic control methods for air flow rates. The general architecture of the air flow control logic for HRV/ERV unit 40 is shown in FIG. 7. FIG. 7 illustrates one embodiment of a control system for operation and regulating air flow rates. Upon startup of the system, the control processor checks that sensors and components are operational and that initial readings are within realistic bounds. After the startup check, the system checks for new operating instructions and target air flow rate set points. If no new instructions are detected, the system will return to previous configuration. Based on selected set points and operating parameters, the system determines initial settings for fan speeds and/or damper positions. In this embodiment, after operation begins, the system determines air flow rates and other variables. The system compares determined flow rates to set points and calculates errors.

If the outdoor air flow rate is outside of acceptable range, the system responds as shown in FIG. 8. To increase outdoor air flow rate, the system will increase the outdoor air fan speed. If outdoor air flow rate is above the set point, the control system corrects for this by reducing the outdoor air fan speed or closing the outdoor air damper (if present) to further reduce outdoor air flow rate. To adjust exhaust air flow rate, controls increase or decrease exhaust fan speed depending on the exhaust flow rate error.

Flow rate adjustments will use a proportional-integral-derivative (PID) controller or other methods to minimize flow rate errors. Control timescales will account for lags associated with damper actuator movement, fan speed adjustment, and achieving relatively steady-state operating conditions.

After adjusting flow rate control parameters, the system outputs determined values, errors, and other operational parameters to the digital control module. The system then checks to determine if there are user or sensor directed changes to operating mode or flow rate set points before repeating the control loop.

Figure 9:
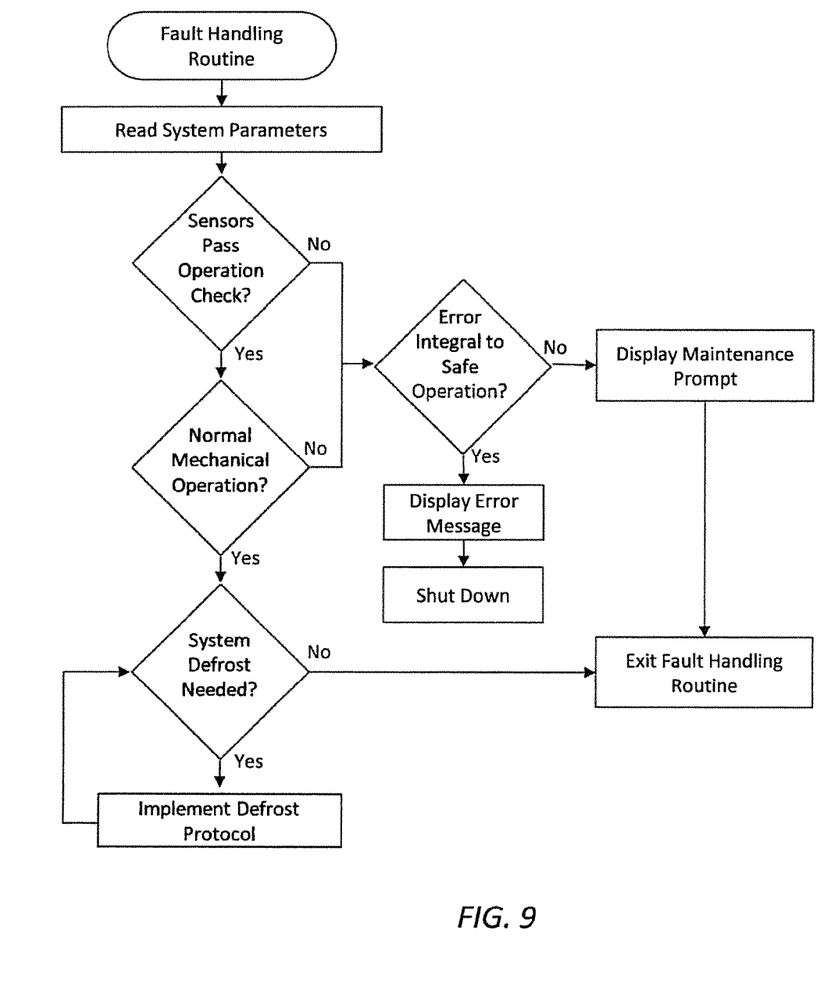
FIG. 9 is a control logic flow diagram of the routine called Fault Handling Routine in FIG. 7 showing the general procedure for fault detection.

FIG. 9 outlines a basic fault detection protocol that can be triggered when sensors detect variances in temperature or flow rate. The fault detection and control protocols may implement frost prevention or defrost as needed, provide alerts when maintenance is required, and provide alerts for abnormal performance or instrument errors. Frost prevention controls may be based on measured air temperature, humidity, flow rates, static pressures, or other parameters. Alerts for filter replacement, cleaning, or other maintenance may be based on changes in static pressures, lower air flow rates, and/or other variables.

The system may also incorporate more advanced ventilation flow rate control based on conditions within the space being served by the HVAC system. A sensor measuring indoor static pressure with respect to outdoors may allow the system to adjust exhaust and supply air flow rates to maintain desired indoor air pressure. When an exhaust fan is turned on elsewhere in the building, for example, outdoor air flow rate through this system can be increased to provide makeup air. The system may incorporate occupancy sensors and/or sensors to measure environmental contaminants or tracer compounds (such as carbon dioxide). In addition to providing user-entered ventilation air flow rates, the system can automatically increase flow rates during occupied periods and/or adjust flow rates to maintain maximum contaminant or tracer concentration.

An apparatus in accordance with the described system was built and tested. The control system prompted the user to enter a desired ventilation flow rate. While measuring the flowrate variables, a control loop according to FIGS. 7 and 8 adjusted outdoor air damper 48, intake fan 44, and exhaust fan 46 to modulate intake air 14 and extract air 26 flow rates. The control loop successfully reduced the difference between determined air flow rates and setpoint target air flow rates to less than 5 cfm over the course of 1 minute and maintained flow rates to within 5 cfm with a sample rate of 100 Hz. Frost prevention damper 52 was also tested and the system operated as desired to temper outdoor air supplied to AAE 42.

The present invention provides a compact HRV/ERV unit that can be installed without significantly increasing footprint or clearances needed for an AHU. The modest footprint allows for installation in smaller mechanical closets, apartments, etc. The compact HRV/ERV unit connects directly to the return side of an AHU, and reduces or eliminates additional air duct installation and connections required by the prior art. The invention's AAE reduces space conditioning energy needed to heat or cool outdoor air. When paired with a small-capacity AHU with an efficient, variable-speed fan motor, the invention allows for power consumption comparable to or lower than most stand-alone HRVs or ERVs currently available. Unlike current state of the art systems, the invention provides continuous control and verification of desired ventilation rates and maintains desired ventilation rates with no short-circuiting of outdoor air regardless of the operating mode of the heating and cooling system.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A heat recovery ventilator, comprising:
    a case adapted to be mounted directly to a return side of an air handling unit of a residential HVAC system, said case having a front face panel, a left side panel, a rear face panel, a right side panel, a top cover panel and a bottom cover panel, and having:
        a first case opening in the left side panel or the right side panel, the first case opening connecting to a mixing plenum in a portion of the case and providing a mixing plenum air inlet for receiving a return air from a conditioned space;
        a second case opening in the same side panel of the first case opening, the second case opening connecting to an extract air flow path and providing an extract air inlet for receiving an extract air portion of the return air from the conditioned space;
        a third case opening in the top cover panel or the bottom cover panel, the third case opening connecting to the mixing plenum and providing a mixing plenum air outlet for releasing air from the mixing plenum directly to the air handling unit;
        a fourth case opening in the rear face panel or the front face panel, the fourth case opening connecting to an outdoor air flow path and providing an outdoor air inlet for receiving an outdoor air;
        a fifth case opening in the rear face panel or the front face panel, the fifth case opening connecting to an exhaust air flow path and providing an exhaust air outlet for releasing an exhaust air;
    the case containing:
        an air-to-air exchanger;
        the extract air flow path connecting the extract air inlet to the air to air exchanger;
        the outdoor air flow path connecting the outdoor air inlet to the air to air exchanger whereby the outdoor air received in the air to air exchanger is tempered by the extract air to provide a tempered outdoor air;
        a tempered outdoor air flow path connecting the air to air exchanger to the mixing plenum whereby the tempered outdoor air is released to the mixing plenum and mixed with the return air from the conditioned space in the mixing plenum; wherein the mixing plenum does not contain the air-to-air exchanger or any other heat exchanger or heat recovery core;
        the exhaust air flow path connecting the air to air exchanger to the exhaust air outlet;
        whereby the extract air is passed through the air to air exchanger and becomes the exhaust air; and
        whereby the exhaust air flows through the exhaust air flow path to the exhaust air outlet;
        a variable speed outdoor air fan provided in the outdoor air flow path or the tempered outdoor air flow path for controlling a quantity of outdoor air received to the air-to-air exchanger; and
        a variable speed exhaust fan provided in the exhaust air flow path for controlling a quantity of extract air received to the air-to-air exchanger.

2. The heat recovery ventilator of claim 1, further comprising an outdoor air intake damper provided in the outdoor air flow path for controlling a quantity of outdoor air received to the air-to-air exchanger.

3. The heat recovery ventilator of claim 2, further comprising a control system which activates the outdoor air intake damper to close the damper when negative pressure in the mixing plenum draws in more outdoor air through the air-to-air exchanger than desired or when closure of the outdoor air flow path is desired.

4. The heat recovery ventilator of claim 1, further comprising a control system, wherein the control system comprises:
    means for determining a volumetric flow rate of air through the outdoor air inlet; and
    means responsive to the means for determining the volumetric flow rate of air through the outdoor air inlet to control a speed of the variable speed outdoor air fan.

5. The heat recovery ventilator of claim 2, further comprising a control system, wherein the control system comprises:
    means for controlling the outdoor air intake damper and/or outdoor air fan.

6. The heat recovery ventilator of claim 1, further comprising a control system to maintain desired ventilation flow rates under varying conditions and heating/cooling operation of the air handling unit, comprising:
    means for receiving a user directed outdoor air volumetric flow target;
    means for comparing a determined volumetric flow rate to the user directed outdoor air volumetric flow target; and
    means of controlling one or more of the fans whereby the difference between the determined volumetric flow rate and the user directed outdoor air volumetric flow target is reduced to less than 5 cfm over the course of 1 minute.

7. The heat recovery ventilator of claim 1, wherein the variable speed outdoor air fan is positioned adjacent to an outer surface of the air to air exchanger in the tempered outdoor air flow path.

8. The heat recovery ventilator of claim 1, wherein the variable speed exhaust fan is positioned adjacent to an outer surface of the air to air exchanger in the exhaust air flow path.

9. An energy recovery ventilator, comprising:
a case adapted to be mounted directly to a return side of an air handling unit of a residential HVAC system, said case having a front face panel, a left side panel, a rear face panel, a right side panel, a top cover panel and a bottom cover panel, and having:
- a first case opening in the left side panel or the right side panel, the first case opening connecting to a mixing plenum in a portion of the case and providing a mixing plenum air inlet for receiving a return air from a conditioned space;
- a second case opening in the same side panel of the first case opening, the second case opening connecting to an extract air flow path and providing an extract air inlet for receiving an extract air portion of the return air from the conditioned space;
- a third case opening in the top cover panel of the bottom cover panel, the third case opening connecting to the mixing plenum and providing a mixing plenum air outlet for releasing air from the mixing plenum directly to the air handling unit;
- a fourth case opening in the rear face panel or the front face panel, the fourth case opening connecting to an outdoor air flow path and providing an outdoor air inlet for receiving an outdoor air;
- a fifth case opening in the rear face panel or the front face panel, the fifth case opening connecting to an exhaust air flow path and providing an exhaust air outlet for releasing an exhaust air;

the case containing:
- an air-to-air exchanger;
- the extract air flow path connecting the extract air inlet to the air to air exchanger;
- the outdoor air flow path connecting the outdoor air inlet to the air to air exchanger whereby the outdoor air received in the air to air exchanger is tempered by the extract air to provide a tempered outdoor air;
- a tempered outdoor air flow path connecting the air to air exchanger to the mixing plenum whereby the tempered outdoor air is released to the mixing plenum and mixed with the return air from the conditioned space in the mixing plenum; wherein the mixing plenum does not contain the air-to-air exchanger or any other heat exchanger or heat recovery core;
- the exhaust air flow path connecting the air to air exchanger to the exhaust air outlet;
- whereby the extract air is passed through the air to air exchanger and becomes the exhaust air; and
- whereby the exhaust air flows through the exhaust air flow path to the exhaust air outlet;
- a variable speed outdoor air fan provided in the outdoor air flow path or the tempered outdoor air flow path for controlling a quantity of outdoor air received to the air-to-air exchanger; and
- a variable speed exhaust fan provided in the exhaust air flow path for controlling a quantity of extract air received to the air-to-air exchanger.

10. The energy recovery ventilator of claim 9, further comprising an outdoor air intake damper provided in the outdoor air flow path for controlling a quantity of outdoor air received to the air-to-air exchanger.

11. The energy recovery ventilator of claim 10, further comprising a control system which activates the outdoor air intake damper to close the damper when negative pressure in the mixing plenum draws in more outdoor air through the air-to-air exchanger than desired or when closure of the outdoor air flow path is desired.

12. The energy recovery ventilator of claim 9, further comprising a control system, wherein the control system comprises:
- means for determining a volumetric flow rate of air through the outdoor air inlet; and
- means responsive to the means for determining the volumetric flow rate of air through the outdoor air inlet to control a speed of the variable speed outdoor air fan.

13. The energy recovery ventilator of claim 10, further comprising a control system, wherein the control system comprises:
- means for controlling the outdoor air intake damper and/or outdoor air fan.

14. The energy recovery ventilator of claim 9, further comprising a control system to maintain desired ventilation flow rates under varying conditions and heating/cooling operation of the air handling unit, comprising:
- means for receiving a user directed outdoor air volumetric flow target;
- means for comparing a determined volumetric flow rate to the user directed outdoor air volumetric flow target; and
- means of controlling one or more of the fans whereby the difference between the determined volumetric flow rate and the user directed outdoor air volumetric flow target is reduced to less than 5 cfm over the course of 1 minute.

15. The energy recovery ventilator of claim 9, wherein the variable speed outdoor air fan is positioned adjacent to an outer surface of the air to air exchanger in the tempered outdoor air flow path.

16. The energy recovery ventilator of claim 9, wherein the variable speed exhaust fan is positioned adjacent to an outer surface of the air to air exchanger in the exhaust air flow path.

17. The heat recovery ventilator of claim 1, wherein the third case opening is provided in the top cover panel and comprises a rectangular opening adapted to mount directly to the air handling unit so that air can be passed directly from the plenum of the HRV/ERV to the plenum of the air handling unit of the HVAC system.

18. The heat recovery ventilator of claim 17, wherein the first case opening and second case opening are provided in the left side panel, and the fourth case opening and fifth case opening are provided in the rear face panel.

19. The energy recovery ventilator of claim 9, wherein the third case opening is provided in the top cover panel and comprises a rectangular opening adapted to mount directly to the air handling unit so that air can be passed directly from the plenum of the HRV/ERV to the plenum of the air handling unit of the HVAC system.

20. The heat recovery ventilator of claim 19, wherein the first case opening and second case opening are provided in the left side panel, and the fourth case opening and fifth case opening are provided in the rear face panel.

* * * * *